United States Patent
Sakata et al.

(10) Patent No.: US 10,080,187 B2
(45) Date of Patent: Sep. 18, 2018

(54) WIRELESS COMMUNICATION APPARATUS, WIRELESS COMMUNICATION SYSTEM, AND SLOT ASSIGNMENT METHOD

(71) Applicant: KABUSHIKI KAISHA TOSHIBA, Tokyo (JP)

(72) Inventors: Ren Sakata, Kanagawa (JP); Hiroki Kudo, Kanagawa (JP); Jumpei Ogawa, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 11 days.

(21) Appl. No.: 14/840,714

(22) Filed: Aug. 31, 2015

(65) Prior Publication Data
US 2016/0066319 A1   Mar. 3, 2016

(30) Foreign Application Priority Data
Sep. 2, 2014   (JP) .................. 2014-178463

(51) Int. Cl.
*H04W 52/02* (2009.01)
*H04B 7/212* (2006.01)
*H04W 84/18* (2009.01)

(52) U.S. Cl.
CPC ...... *H04W 52/0203* (2013.01); *H04B 7/2121* (2013.01); *H04W 84/18* (2013.01); *Y02D 70/00* (2018.01); *Y02D 70/22* (2018.01); *Y02D 70/446* (2018.01)

(58) Field of Classification Search
None
See application file for complete search history.

(56) References Cited

U.S. PATENT DOCUMENTS

| | | | |
|---|---|---|---|
| 7,974,240 B2 | 7/2011 | Liu et al. | |
| 8,755,336 B2 | 6/2014 | Kondo et al. | |
| 8,982,770 B2 | 3/2015 | Sugiyama et al. | |
| 9,693,362 B2 * | 6/2017 | Lee .................. | H04W 72/0446 |

(Continued)

FOREIGN PATENT DOCUMENTS

| | | |
|---|---|---|
| JP | 2008-022558 | 1/2008 |
| JP | 2008-503153 | 1/2008 |

(Continued)

OTHER PUBLICATIONS

Engish-language machine-translation of JP2008-228180.
English-language machine-translation of JP 2010-166543.

*Primary Examiner* — Kibrom T Hailu
(74) *Attorney, Agent, or Firm* — Nixon & Vanderhye, P.C.

(57) ABSTRACT

A wireless communication apparatus according to an embodiment includes a transceiver and a transmission slot determiner. The transceiver transmits/receives information. The transmission slot determiner determines a transmission slot in which the transceiver transmits information, from a frame time-divided into a plurality of slots, based on the rank value of self node corresponding to the number of hops to a root node. A plurality of slot groups including a plurality of continuous slots is set in the frame. The slot groups are assigned different rank values. The transmission slot determiner selects a slot group to which the rank value of self node is assigned, and determines a transmission slot from among the slots included in the selected slot group.

13 Claims, 18 Drawing Sheets

(56) References Cited

U.S. PATENT DOCUMENTS

| | | | |
|---|---|---|---|
| 2003/0058826 A1 | 3/2003 | Shearer, III | |
| 2008/0165797 A1* | 7/2008 | Aceves | H04L 47/10 370/458 |
| 2008/0267159 A1* | 10/2008 | Mattsson | G08B 25/01 370/345 |
| 2011/0051645 A1* | 3/2011 | Hong | H04L 45/48 370/311 |
| 2012/0201193 A1 | 8/2012 | Sugiyama et al. | |

FOREIGN PATENT DOCUMENTS

| | | |
|---|---|---|
| JP | 2008-199332 | 8/2008 |
| JP | 2008-228180 | 9/2008 |
| JP | 2009-239778 | 10/2009 |
| JP | 2010-166543 | 7/2010 |
| JP | 2011-091684 | 5/2011 |
| WO | 2009/119867 | 10/2009 |

* cited by examiner

WIRELESS COMMUNICATION APPARATUS, WIRELESS COMMUNICATION SYSTEM, AND SLOT ASSIGNMENT METHOD

CROSS REFERENCE TO RELATED APPLICATION(S)

This application is based upon and claims the benefit of priority from the prior Japanese Patent Application No. 2014-178463, filed on Sep. 2, 2014, the entire contents of which are incorporated herein by reference.

FIELD

Embodiments described herein relate generally to a wireless communication apparatus, a wireless communication system, and a slot assignment method.

BACKGROUND

A mesh network in which multiple wireless nodes are connected in a mesh form has been used. As a communication scheme for the wireless mesh network, a time-division communication scheme has been adopted, for example. The time-division communication scheme can facilitate control of the timing to cause each wireless node to sleep, thus allowing for energy-saving of the wireless mesh network.

However, the wireless mesh network has a problem that information transmitted by each wireless node is relayed by a plurality of wireless nodes to be transmitted to a root node, and thus it takes time to transmit the information to the root node.

DETAILED DESCRIPTION

Embodiments will now be explained with reference to the accompanying drawings. The present invention is not limited to the embodiments.

A wireless communication apparatus according to an embodiment includes a transceiver and a transmission slot determiner. The transceiver transmits/receives information. The transmission slot determiner determines a transmission slot in which the transceiver transmits information, from a frame time-divided into a plurality of slots, based on the rank value of self node corresponding to the number of hops to a root node. A plurality of slot groups including a plurality of continuous slots is set in the frame. The slot groups are assigned different rank values. The transmission slot determiner selects a slot group to which the rank value of self node is assigned, and determines a transmission slot from among the slots included in the selected slot group.

First Embodiment

Figure 1:
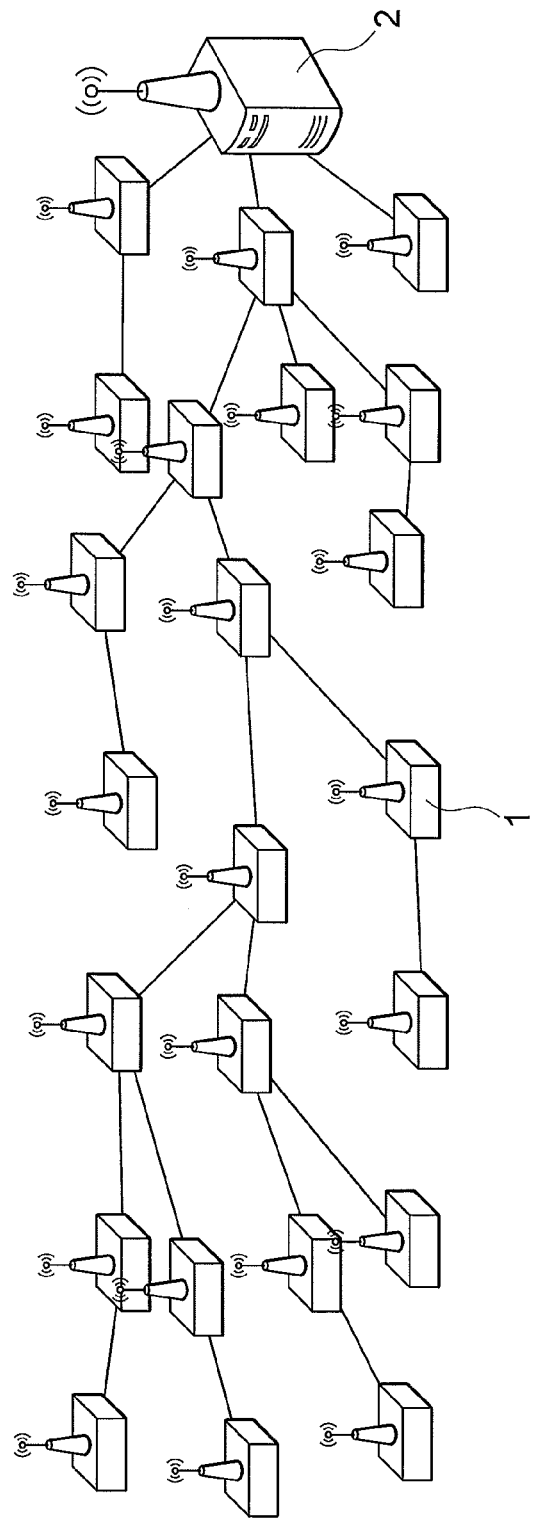
FIG. 1 is a diagram illustrating an example of a configuration of a wireless communication system according to a first embodiment.

First, a wireless communication system according of a first embodiment will be described with reference to FIGS. 1 to 6. FIG. 1 is a diagram illustrating an example of a configuration of the wireless communication system according of this embodiment. As shown in FIG. 1, the wireless communication system includes a plurality of wireless communication apparatuses 1 and a collection apparatus 2. The wireless communication system builds a wireless mesh network with the wireless communication apparatuses 1 as wireless nodes and with the collection apparatus 2 as a root node, in which a time-division communication scheme is used for communication.

In this wireless communication system, the wireless communication apparatuses 1 disposed in a predetermined area and the collection apparatus 2 can wirelessly communicate with each other. The wireless communication apparatuses 1 are equipped with a desired sensor such as a temperature sensor or an acceleration sensor, for example, and wirelessly transmit information measured by the sensors. Information transmitted by each wireless communication apparatus 1 is transmitted via other wireless communication apparatus(es) 1 or directly to the collection apparatus 2. The collection apparatus 2 collects information transmitted from the wireless communication apparatuses 1. The collection apparatus is a server equipped with a wireless communication function, for example.

Figure 2:
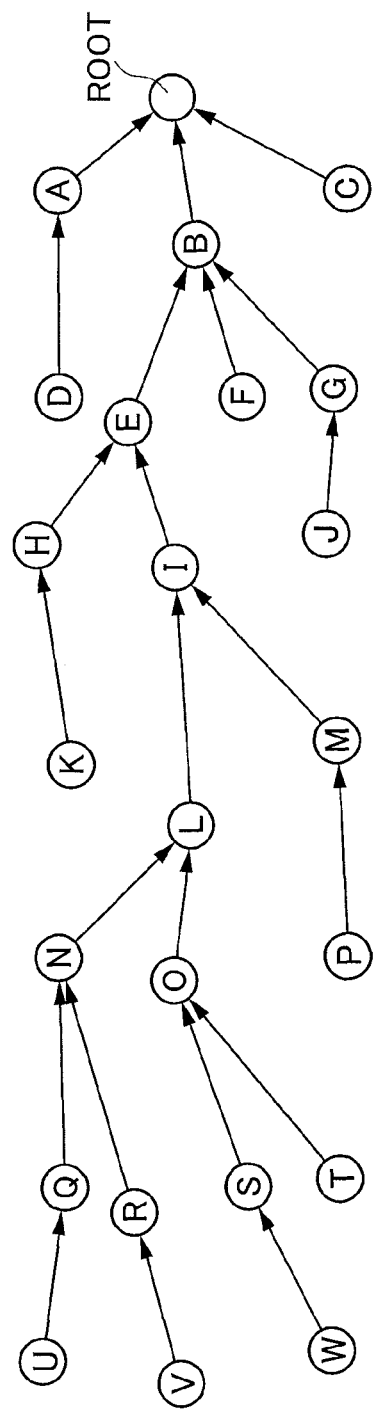
FIG. 2 is a diagram illustrating FIG. 1 in the form of a network topology.

FIG. 2 is a diagram schematically illustrating the wireless communication system in FIG. 1 in the form of a network topology. In FIG. 2, alphabets denote wireless nodes (the wireless communication apparatuses 1), ROOT refers to a root node (the collection apparatus 2), and arrows indicate information transmission paths. The source of an arrow is a transmission source, and the tip of an arrow indicates an information transmission destination.

In the following description, each wireless communication apparatus 1 is referred to as a wireless node X, and the collection apparatus 2 as a root node. X corresponds to an alphabet in the figure. A side closer to the root node than a wireless node X (on which the number of hops to the root node is lower) is referred to as an upstream side, and a side farther from the root node (on which the number of hops to the root node is higher) as a downstream side. A wireless node or root node on the upstream side that transmits/receives information to/from a wireless node X is referred to as a parent node, and a wireless node on the downstream side as a child node. For example, in FIG. 2, a parent node of a wireless node B is the root node, and its child nodes are wireless nodes E, F, and G.

Further, transmission by a wireless node X of information received from a child node (parent node) to a parent node (child node) is referred to as relay. Relay also includes transmission with information on a wireless node X such as sensor information added to received information. In this embodiment, description will be made of an uplink in which information is transmitted from the downstream side to the upstream side.

Figure 3:
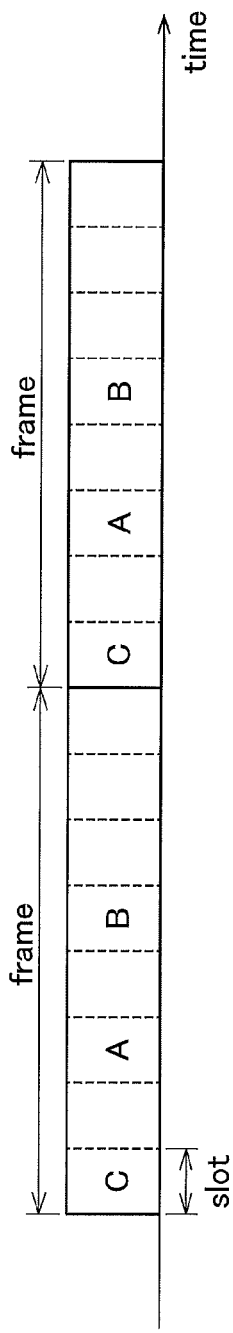
FIG. 3 is a diagram explaining a time-division communication scheme.

FIG. 3 is a diagram explaining a time-division communication scheme. In the time-division communication scheme, an operating time in one cycle of a wireless communication system is predetermined. The operating time is referred to as a frame. The wireless communication system operates by repeating the frame.

Each frame is time-divided into slots. Each slot is assigned as an operating time of one or more wireless nodes. Wireless nodes transmit information during assigned slots. For example, in FIG. 3, the first slot is assigned to a wireless node C, the third slot to a wireless node A, and the fifth slot to a wireless node B. In this case, the wireless node C transmits information during the first slot in each frame. A frame may include a slot not assigned as an operating time of any wireless node.

Figure 4:
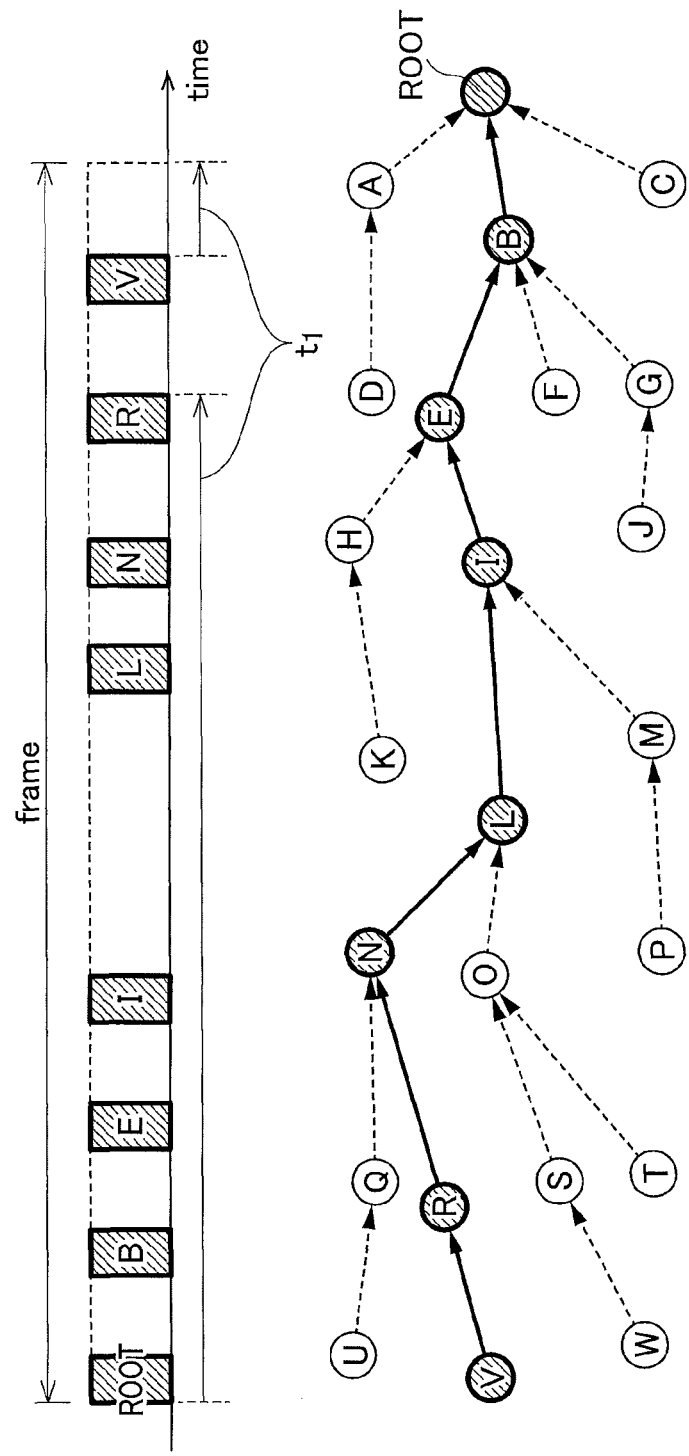
FIG. 4 is a diagram illustrating an example of a wireless mesh network.
Figure 5:
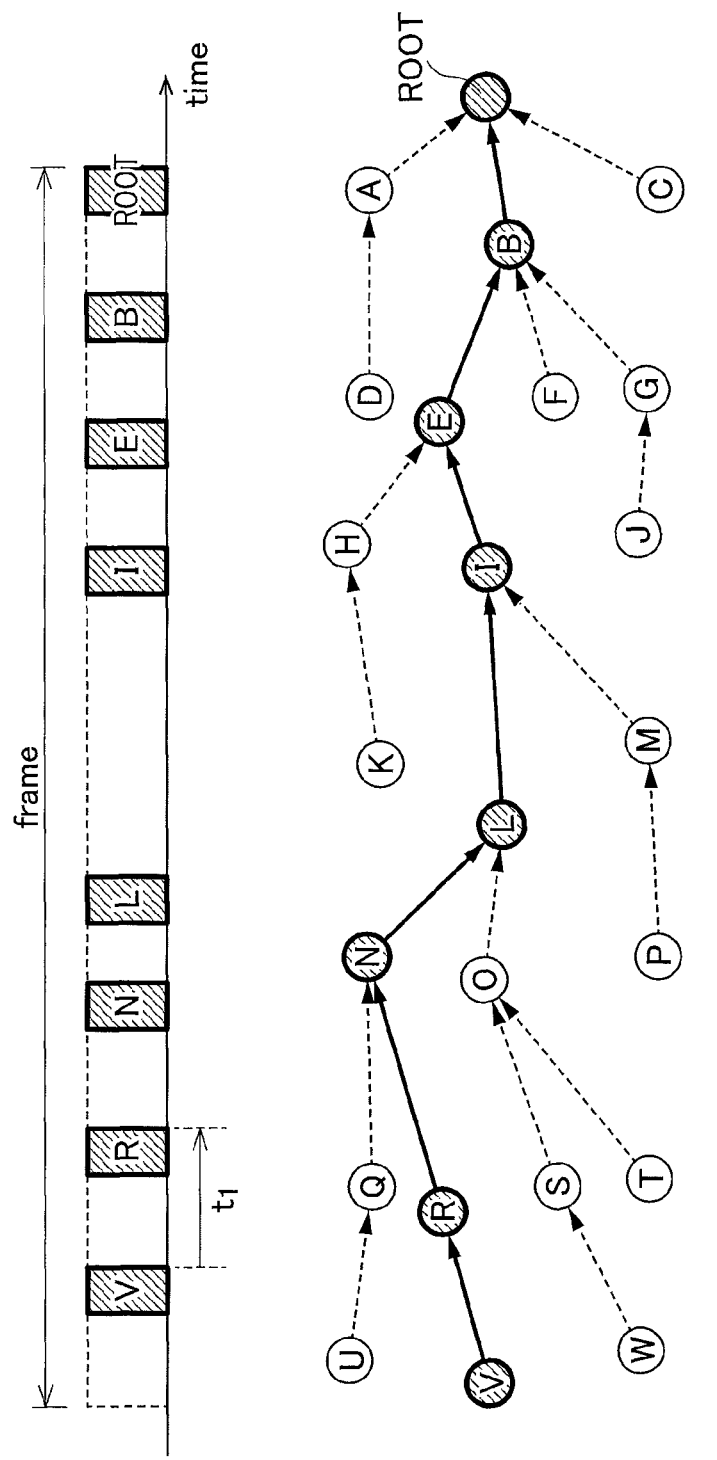
FIG. 5 is a diagram illustrating an example of the wireless mesh network.

FIGS. 4 and 5 are diagrams illustrating an example of a wireless mesh network that adopts the time-division communication scheme. In a wireless mesh network in FIG. 4, a slot earlier in time in a frame is assigned to a wireless node located further rearward in an information transmission path. Specifically, while an information transmission path from a wireless node V is wireless nodes V, R, N, L, I, E, B, and a root node, slots are assigned in the order of the root node, the wireless nodes B, E, I, L, N, R, and V.

When the slots are assigned like this, a waiting time $t_1$ until information transmitted from the wireless node V is relayed by the wireless node R is about one frame. Subsequent wireless nodes also take similar waiting times. Therefore, in the wireless mesh network in FIG. 4, an information transmission time until information transmitted from the wireless node V is transmitted to the root node is several frames.

By contrast, in a wireless mesh network in FIG. 5, a slot earlier in time in a frame is assigned to a wireless node located further forward in an information transmission path. Specifically, while an information transmission path from a wireless node V is wireless nodes V, R, N, L, I, E, B, and the root node, slots are assigned in the order of the wireless nodes V, R, N, L, I, E, B, and the root node.

When the slots are assigned like this, a waiting time $t_1$ until information transmitted from the wireless node V is relayed by the wireless node R is about a time of one slot group. Subsequent wireless nodes similarly take about a waiting time of one slot group. As a result, in the wireless mesh network in FIG. 5, an information transmission time until information transmitted from the wireless node V is transmitted to the root node is within one frame.

In the wireless communication system according to this embodiment, slots are assigned to wireless nodes so as to build the wireless mesh network in FIG. 5. That is, a slot earlier in time in a frame is assigned to a wireless node located further forward in a transmission path. In an uplink, a wireless node located further forward in a transmission path is a wireless node on the downstream side. Hereinafter, a slot assignment method will be described.

Figure 6:
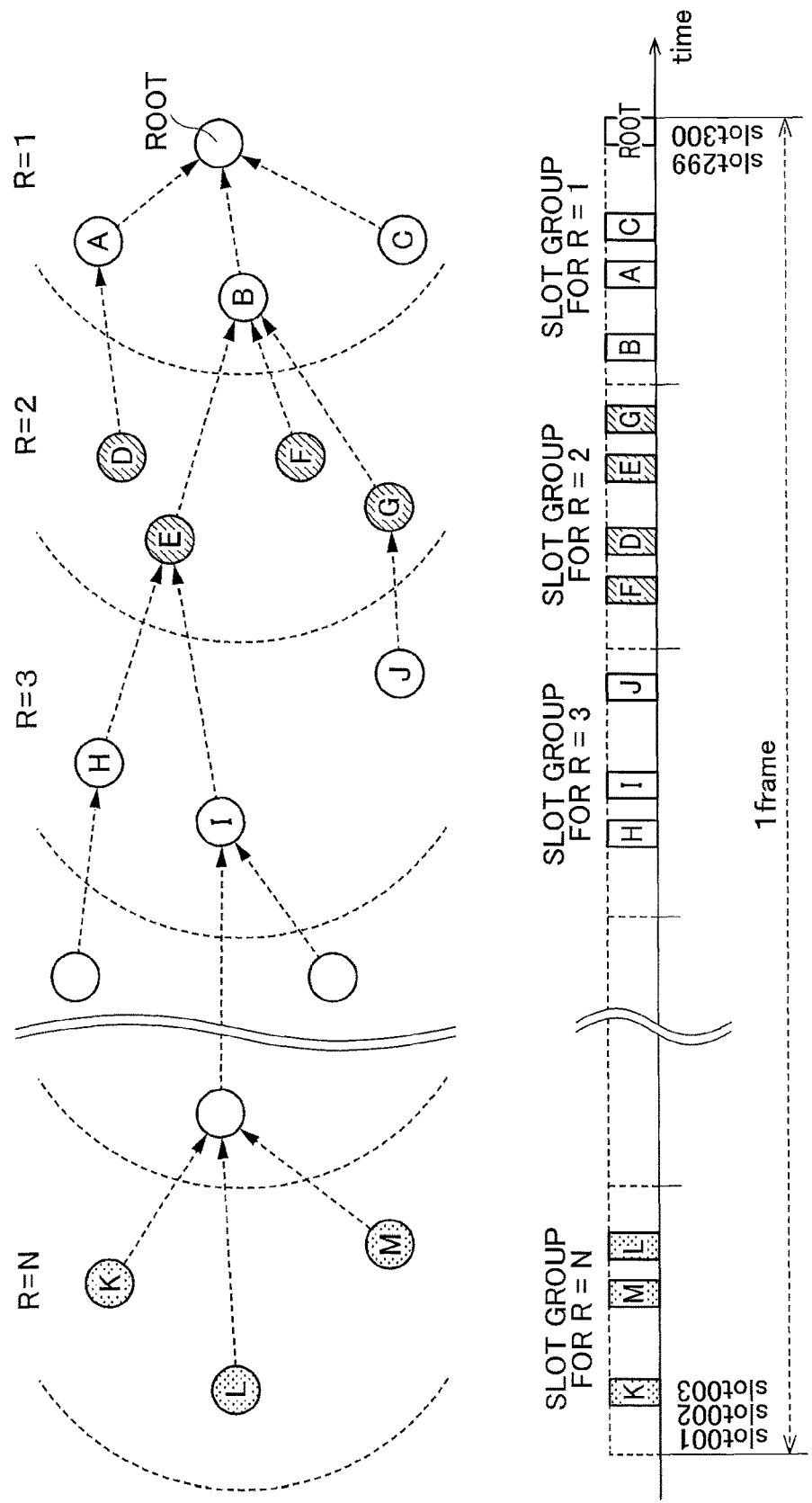
FIG. 6 is a diagram explaining a slot assignment method according to the first embodiment.

FIG. 6 is a diagram explaining a slot assignment method in the wireless communication system according to this embodiment. In this embodiment, a rank value R is set for each wireless node. A rank value R is the number of hops from each wireless node to the root node. For example, in FIG. 6, for the wireless node A, a rank value of 1 is set because its hop count is one, and for the wireless node D, a rank value of 2 is set because its hop count is two. Since the maximum number of hops is N in the wireless communication system in FIG. 6, one rank value R of 1 to N is set for each wireless node.

In this embodiment, a plurality of slot groups is set in a frame. A slot group is a period of time including a plurality of continuous slots. In order to prevent slot groups from overlapping, slot groups are set more than or equal to the maximum number of hops N in the wireless communication system. For example, when a frame is time-divided into 300 slots and the maximum number of hops N=10, 10 slot groups each including continuous 30 slots can be set. The numbers of slots included in the slot groups may be the same or may be different. The frame may include a period of time in which no slot group is set.

Further, the above-described rank values R are assigned to the set slot groups. At this time, a higher rank value R is assigned to a slot group earlier in time in the frame, and a lower rank value R is assigned to a slot group later in time. For example, a rank value N is assigned to the first slot group in the frame in FIG. 6, and a rank value of 1 is assigned to the last slot group.

Each slot is assigned to a wireless node having the same rank value as the rank value R assigned to a slot group that includes the slot. For example, slots included in the first slot group (a slot group for R=N) in FIG. 6 are assigned to wireless nodes K, L, and M for which the rank value N is set, respectively. Likewise, slots included in the last slot group (a slot group for R=1) in FIG. 6 are assigned to wireless nodes A, B, and C for which the rank value of 1 is set, respectively.

By assigning slots like this, a slot earlier in time in the frame is assigned to a wireless node located further downstream. For example, when we focus on a wireless node I in FIG. 6, its information transmission path is in the order of wireless nodes I, E, B, and a root node from downstream, and their slots are assigned in the order of the wireless nodes I, E, and B from the front. That is, a slot earlier in time is assigned to a wireless node located further downstream. This is the same when we focus on other wireless nodes.

Thus, the slot assignment method and the wireless communication system according to this embodiment allow information transmission time from each wireless node to the root node to be reduced to within one frame.

Figure 7:
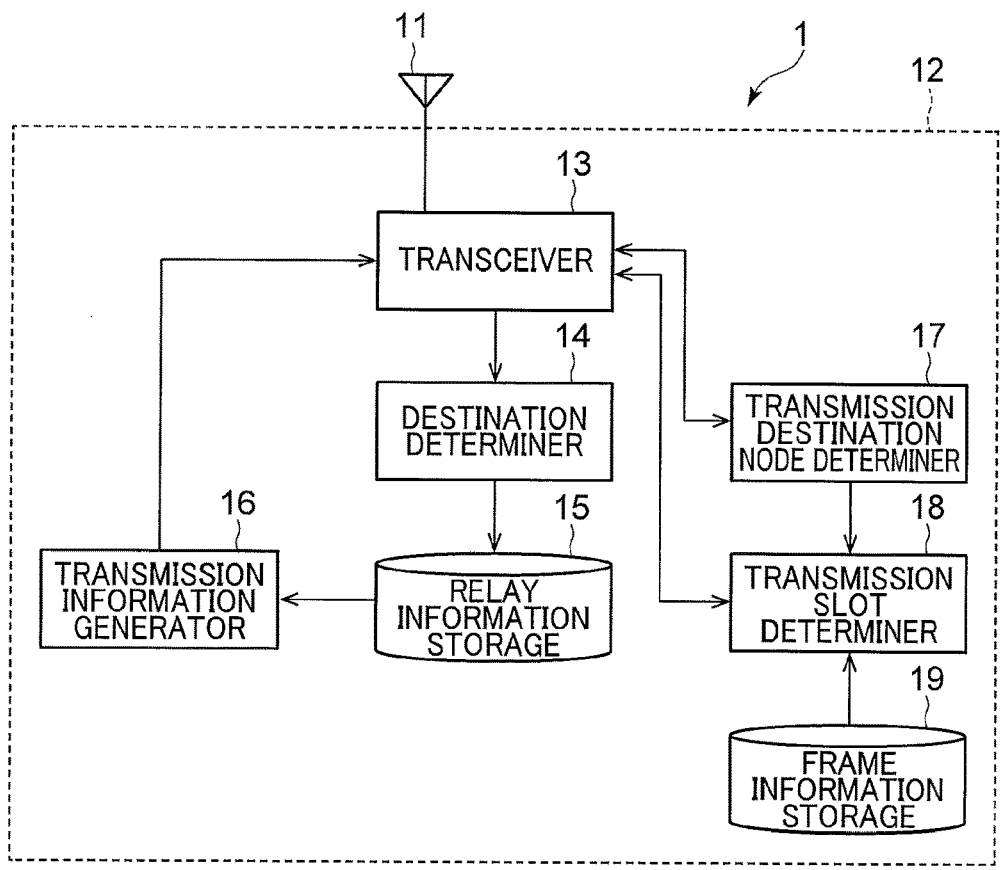
FIG. 7 is a diagram illustrating a configuration of a wireless communication apparatus according to the first embodiment.

Next, a configuration of the wireless communication apparatuses 1 constituting the wireless communication system according to this embodiment will be described with reference to FIG. 7. The wireless communication apparatuses 1 according to this embodiment automatically implement slot assignment as described above. FIG. 7 is a diagram illustrating the configuration of a wireless communication apparatus 1. As shown in FIG. 7, the wireless communication apparatus 1 has a transmission/reception antenna 11 and a wireless communicator 12.

Hereinafter, the wireless communication apparatus 1 is referred to as self node, a wireless node that transmits information to self node as a transmission source node, and a wireless node to which self node transmits information as a transmission destination node. A slot group to which a rank value R is assigned is referred to as a slot group R.

The transmission/reception antenna 11 transmits/receives wireless signals. The transmission/reception antenna 11 converts a received wireless signal into an electrical signal and inputs it into the wireless communicator 12, and converts an electrical signal output from the wireless communicator 12 into a wireless signal and transmits it.

The wireless communicator 12 includes a transceiver 13, a destination determiner 14, a relay information storage 15, a transmission information generator 16, a transmission destination node determiner 17, a transmission slot determiner 18, and a frame information storage 19.

The transceiver 13 performs predetermined signal processing on an electrical signal input from the transmission/reception antenna 11 to extract reception information from the received wireless signal. Thus, the transceiver 13 receives reception information. Reception information includes the rank value, sensor information, node ID, and relay information of a transmission source node, and the node ID of a transmission destination node. A node ID is an identifier of each wireless communication apparatus 1 constituting the wireless communication system. Relay information is information from another wireless node that a transmission source node has relayed. A transmission destination node included in reception information is a wireless node to which a transmission source node transmits information, and is not necessarily a transmission destination node of self node. The signal processing includes processing such as A/D conversion and decoding according to a predetermined communication protocol.

The transceiver 13 also performs predetermined signal processing on transmission information generated by the transmission information generator 16 to convert it into an electrical signal, and outputs it to the transmission/reception antenna 11. Thus, the transceiver 13 transmits transmission information. Transmission information includes the rank value, sensor information, node ID, and relay information of self node, and the node ID of a transmission destination node. The signal processing includes processing such as D/A conversion and encoding according to a predetermined communication protocol.

The destination determiner 14 obtains reception information from the transceiver 13, and determines whether the transmission destination of the reception information is self node. When the node ID of the transmission destination node of the reception information is the node ID of self node, the destination determiner 14 determines that the destination of the reception information is self node.

The relay information storage 15 temporarily stores, as relay information, reception information whose destination is determined as self node by the destination determiner 14.

The transmission information generator 16 generates transmission information, based on relay information stored in the relay information storage 15. Transmission information is generated by adding information such as the rank value, sensor information, node ID, and the node ID of a transmission destination node of self node to relay information. Transmission information generated by the transmission information generator 16 is transmitted by the transceiver 13.

The transmission destination node determiner 17 determines a transmission destination node of transmission information, based on reception information received by the transceiver 13. In an uplink, a transmission destination node is a parent node. For example, the transmission destination node determiner 17 determines, as a transmission destination node, a wireless node whose wireless signal has the highest signal strength among wireless nodes whose rank value in reception information is one lower than the rank value of self node.

The transmission destination node determiner 17 also determines the rank value of self node, based on a determined transmission destination node. For example, the transmission destination node determiner 17 determines a transmission destination node in the above-described method, and determines a rank value one higher than the rank value of the transmission destination node as the rank value of self node.

The transmission slot determiner 18 determines a transmission slot as a slot in which self node transmits transmission information, based on frame information. Frame information is setting information on a frame, slots, slot groups, and the like in the wireless communication system as described above. Frame information may be previously registered in the wireless communication apparatus 1, or may be registered and updated by wireless communication. Frame information is stored in the frame information storage 19.

The transmission slot determiner 18 first selects a slot group R, based on the rank value R of self node determined by the transmission destination node determiner 17, and the frame information stored in the frame information storage 19. Next, the transmission slot determiner 18 determines a transmission slot from among slots included in the slot group R.

For example, by using the node ID of self node, a transmission slot is determined from among the slot group R. In this case, the node IDs of the wireless nodes constituting the wireless communication system may be assigned to slots included in slot groups. For example, when the wireless communication system includes 20 wireless nodes that have node IDs 1 to 20, slot groups are set to include 20 slots to which the node IDs 1 to 20 are assigned. The transmission slot determiner 18 can determine, as a transmission slot, a slot to which the node ID of self node is assigned from among the slot group R. The method of determining a transmission slot from among the slot group R is not limited to this.

The transmission slot determiner 18 may perform synchronization processing before determining a transmission slot. The synchronization processing is processing to synchronize a time counted by self node with another wireless node.

For example, the transmission slot determiner 18 obtains a transmission time (transmission slot) of a transmission source node, based on the rank value and node ID of the transmission source node included in reception information received by the transceiver 13, and the frame information. By comparing a time obtained by adding a signal processing time by the transceiver 13 of self node to the transmission time, with a time counted by self node, the transmission slot determiner 18 can perform the synchronization processing. At this time, a time required for the propagation of a wireless signal from the transmission source node may be added to perform the synchronization processing.

Figure 8:
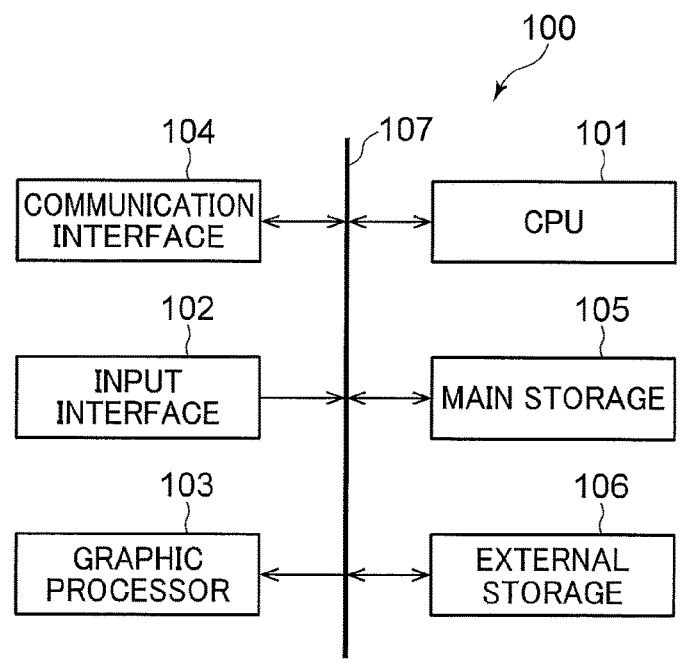
FIG. 8 is a block diagram illustrating a hardware configuration of a wireless communicator.

Next, a hardware configuration of the wireless communicator 12 will be described with reference to FIG. 8. The wireless communicator 12 is constituted by a computer 100 as shown in FIG. 8. The computer 100 has a CPU 101, an input interface 102, a graphic processor 103, a communication interface 104, a main storage 105, and an external storage 106, which are connected to each other by a bus 107.

The CPU (central processing unit) 101 executes a wireless communication program on the main storage 105. The wireless communication program is a program for implementing the above-described functional components of the wireless communication apparatus 1. By the CPU 101 executing the wireless communication program, the functional components of the wireless communicator 12 are implemented.

The input interface 102 is a device for inputting an operation signal of an input device such as a keyboard or a mouth into the wireless communication apparatus 1. The computer 100 may be configured without the input interface 102.

The graphic processor 103 is a device for displaying video or images on a display such as a liquid crystal display (LCD), a cathode-ray tube (CRT), or a plasma display (PDP), based on a video signal or an image signal generated by the CPU 101. The computer 100 may be configured without the graphic processor 103.

The communication interface 104 is a device for the wireless communication apparatus 1 to wirelessly communicate with another wireless node. The functional component of the transceiver 13 is implemented by the wireless communication interface 104.

In execution of a wireless communication program, the main storage 105 stores a wireless communication program, data necessary for execution of the wireless communication program, data generated by the execution of the wireless communication program, and so on. The wireless communication program is developed on the main storage 105 to be executed. The main storage 105 is, for example, RAM, DRAM, or SRAM, but is not limited to them. The main storage 105 can store information such as a wireless communication program, relay information, frame information, a node ID, a rank value R, a parent node, a child node, and so on. The main storage 105 may store an OS, a BIOS, and various kinds of middleware of the computer 100.

The external storage 106 stores a wireless communication program, data necessary for execution of the wireless communication program, data generated by the execution of the wireless communication program, and so on. The program and data are read into the main storage 105 for execution of the wireless communication program. The external storage 106 is, for example, a hard disk, an optical disk, a flash memory, or a magnetic tape, but is not limited to them. The external storage 106 can store a wireless communication program, information such as relay information, frame information, a node ID, a rank value R, a parent node, a child node, and so on.

A wireless communication program may be preinstalled in the computer 100, or may be transmitted to the wireless communication apparatus 1 by wireless communication and installed in the computer 100.

Figure 9:
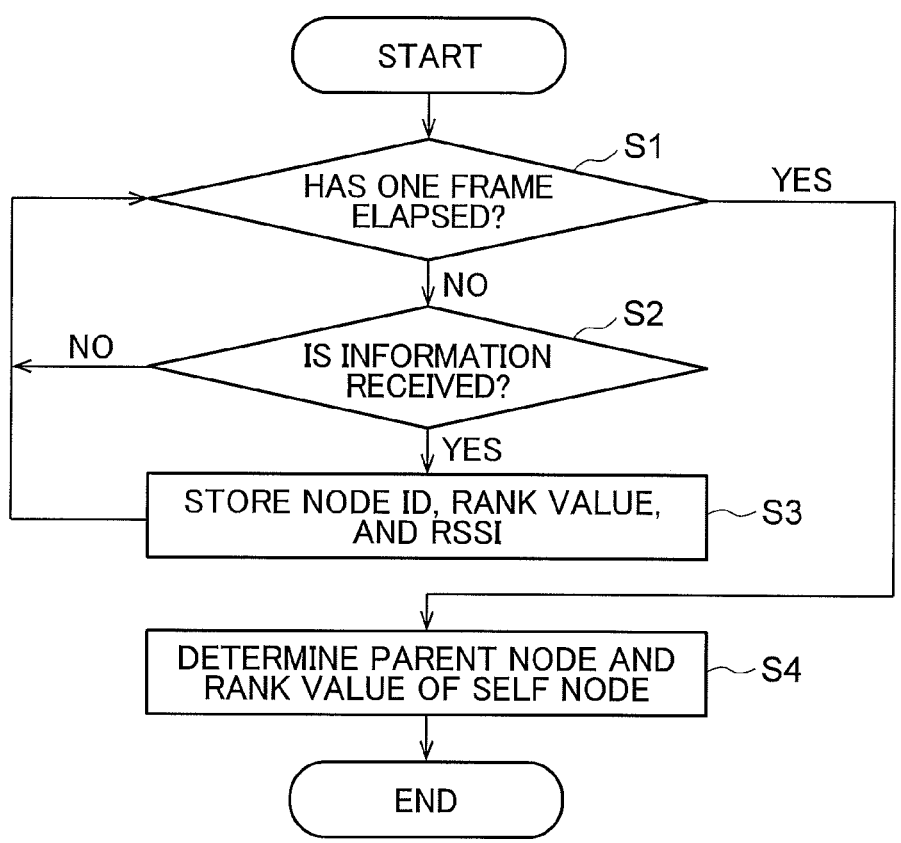
FIG. 9 is a flowchart showing an initial operation of the wireless communication apparatus according to the first embodiment.

Next, an operation of the wireless communication apparatus 1 according to this embodiment will be described. FIG. 9 is a flowchart showing an initial operation of the wireless communication apparatus 1, that is, an operation when power is turned on. In the following description, it is assumed that the wireless communication apparatus 1 has previously stored frame information and a node ID.

In step S1, the transceiver 13 starts reception processing, and determines whether one frame has elapsed since power-on. The transceiver 13 continues the reception processing until one frame has elapsed. Determination by the transceiver 13 is not limited to one frame. When the transceiver 13 receives reception information (YES in step S2) before one frame has elapsed (NO in step S1), the processing proceeds to step S3.

In step S3, the transmission destination node determiner 17 obtains the reception information received by the transceiver 13, and stores the node ID, rank value, and signal strength of a wireless signal (RSSI) of the transmission source node of the reception information (step S3).

The wireless communication apparatus 1 repeats the operation of the above steps S1 to S3 until one frame has elapsed since power-on. When one frame has elapsed (YES in step S1), the processing proceeds to step S4.

In step S4, the transmission destination node determiner 17 determines a transmission destination node (parent node), based on the stored node ID(s), rank value(s), and signal strength(s) of the wireless signal(s) of the transmission source node(s) (step S4). As described above, the transmission destination node determiner 17 determines a transmission source node having the lowest rank value and the highest signal strength as a transmission destination node (parent node). It also determines a rank value one higher than the rank value of the transmission destination node (parent node) as the rank value of self node.

Figure 10:
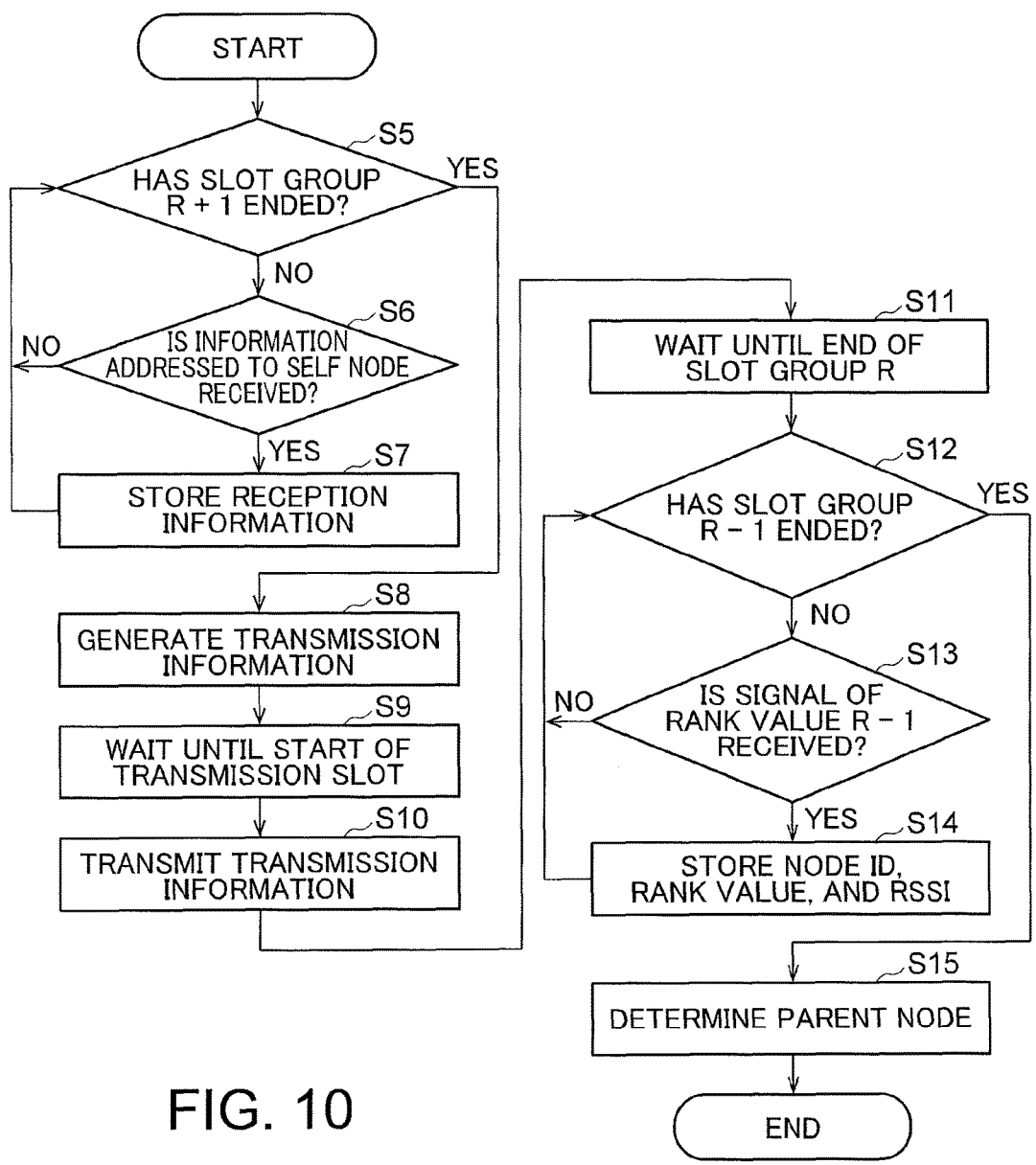
FIG. 10 is a flowchart showing a normal operation of the wireless communication apparatus according to the first embodiment.

FIG. 10 is a flowchart showing a normal operation in one frame of the wireless communication apparatus 1. Hereinafter, assume that the rank value of self node is determined as R in the above-described step S4. Also assume that a transmission slot is determined by the transmission slot determiner 18, based on the rank value R and the node ID of self node.

In step S5, the wireless communication apparatus 1 determines whether a slot group R+1 assigned a rank value R+1 one higher than the rank value R of self node has ended. The transceiver 13 continues the reception processing until the slot group R+1 ends.

When the transceiver 13 receives reception information addressed to self node (YES in step S6) before the slot group R+1 ends (NO in step S5), the processing proceeds to step S7. Determination of whether the reception information is addressed to self node, that is, the transmission destination node of the reception information is self node is performed by the destination determiner 14.

In step S7, the relay information storage 15 stores the reception information addressed to self node as relay information. The wireless communication apparatus 1 repeats the operation of the above steps S5 to S7 until the slot group R+1 ends to receive transmission information (relay information) of a transmission source node (child node). When the slot group R+1 ends (YES in step S5), the processing proceeds to step S8. Here, description will be made on the assumption that the slot group R starts at the same time as the slot group R+1 ends, but there may be a period of time to which a rank value is not assigned between the slot group R+1 and the slot group R.

In step S8, the transmission information generator 16 adds information such as the node ID, sensor information, and rank value R of self node to the relay information stored in the relay information storage 15 to generate transmission information. The information stored in the relay information storage 15 is deleted after the transmission information generator 16 generates the transmission information.

In step S9, the wireless communication apparatus 1 waits until the transmission slot determined by the transmission slot determiner 18 is started. During the waiting period, the transceiver 13 may continue the reception processing, or may stop it. When the transmission slot is started, the processing proceeds to step S10. When the transmission slot is started simultaneously with the start of the slot group R, step S9 is omitted.

In step S10, the transceiver 13 transmits the transmission information generated by the transmission information generator 16 to the transmission destination node (parent node) determined by the transmission destination node determiner 17. The transmission information transmitted by the transceiver 13 is converted into a wireless signal and transmitted to the transmission destination node via the transmission/reception antenna 11. Through the above steps S5 to S10, the information received from the transmission source node (child node) can be relayed to the transmission destination node (parent node). When the transmission slot ends, the processing proceeds to step S11.

In step S11, the wireless communication apparatus 1 waits until the slot group R ends. During the waiting period, the transceiver 13 may perform the reception processing, or may stop it. When the slot group R ends, the processing proceeds to step S12. When the transmission slot ends simultaneously with the end of the slot group R, step S11 is omitted.

In step S12, the wireless communication apparatus 1 determines whether a slot group R−1 assigned a rank value R−1 one lower than the rank value R of self node has ended. The transceiver 13 continues the reception processing until the slot group R−1 ends.

When the transceiver 13 receives reception information of the rank value R−1 (YES in step S13) before the slot group R−1 ends (NO in step S12), the processing proceeds to step S14. Determination of whether the rank value of the reception information is R−1 is performed by the transmission slot determiner 18.

In step S14, the transmission slot determiner 18 stores the rank value R−1, node ID, and signal strength of a wireless signal of the transmission source node of the reception information. The wireless communication apparatus 1 repeats the operation of the above steps S12 to S14 until the slot group R−1 ends to receive transmission information of a transmission destination node (parent node). When the slot group R−1 ends (YES in step S12), the processing proceeds to step S15.

In step S15, the transmission destination node determiner 17 determines a transmission destination node (parent node), based on the stored node ID(s), rank value, and signal strength(s). For example, the transmission destination node determiner 17 determines a wireless node having the highest signal strength as the transmission destination node.

Through the above steps S12 to S15, the transmission destination node (parent node) can be updated to a wireless node having the highest signal strength for every one frame. Therefore, even when a new wireless node is added to the wireless communication system, the wireless communication apparatus 1 can transmit transmission information to an optimal parent node. When the transmission destination node is not updated, steps S12 to S15 may be omitted.

As described above, the wireless communication apparatus according to this embodiment can automatically determine a transmission slot so as to implement the above-described slot assignment method, based on the rank value of self node and frame information. Thus, the wireless communication apparatus 1 can transmit information to the root node within one frame.

Second Embodiment

Figure 11:
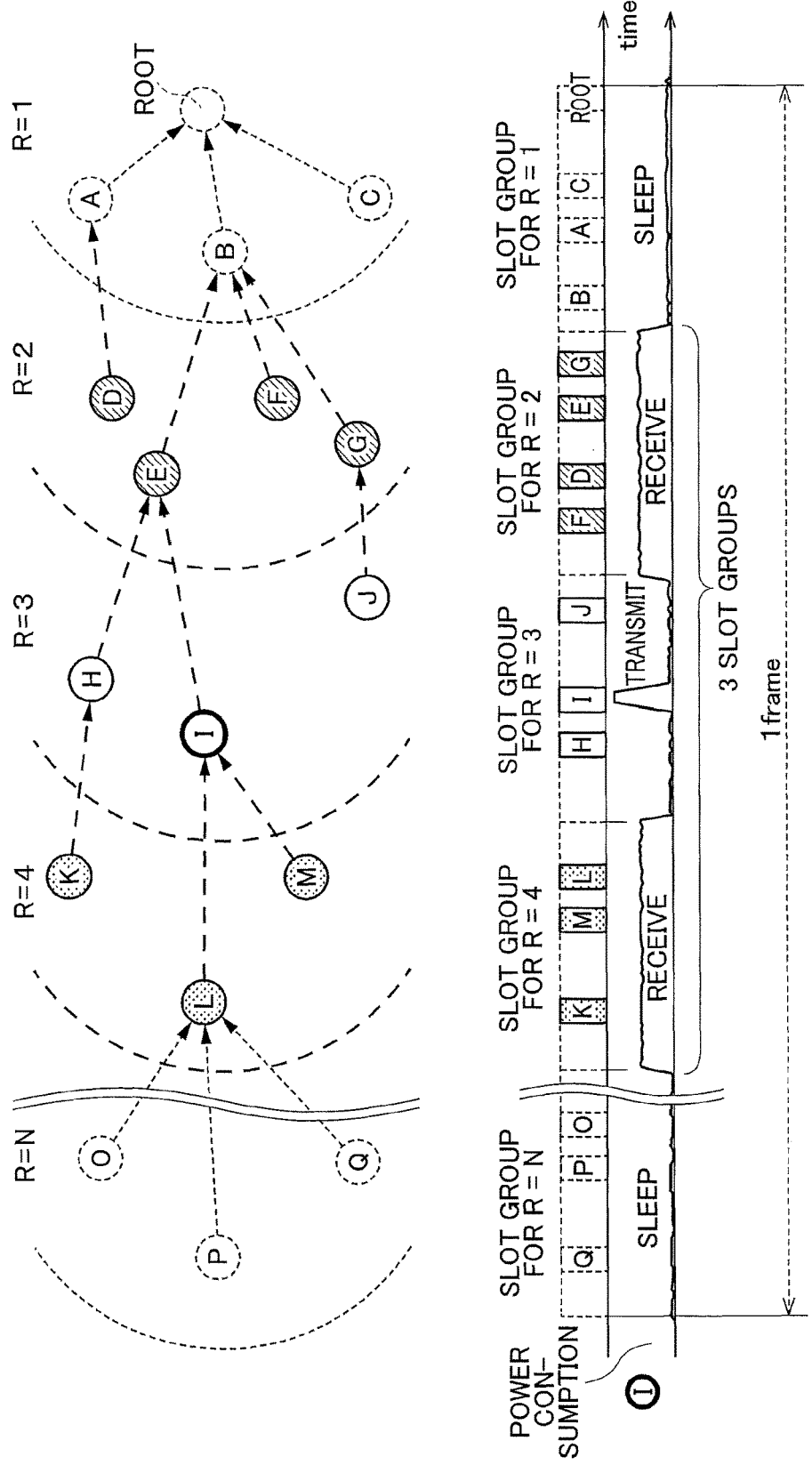
FIG. 11 is a diagram illustrating an example of a configuration of a wireless communication system according to a second embodiment.

Next, a wireless communication system according to a second embodiment will be described with reference to FIG. 11. FIG. 11 is a diagram illustrating an example of a configuration of the wireless communication system. In this wireless communication system, wireless nodes constituting the wireless communication system are in a sleep state for predetermined periods of time. The other configuration is similar to that in the first embodiment.

The sleep state is a state in which a wireless communicator 12 stops arithmetic processing and a communication function, and only performs counting of time. In the sleep state, transmission/reception of information is not performed, and thus the power consumption of the wireless communication apparatus 1 is reduced. Hereinafter, a state in which a wireless node can transmit/receive information is referred to as a wake-up state. Shifting from the wake-up state to the sleep state of the wireless communicator 12 is referred to as "sleep," and shifting from the sleep state to the wake-up state is referred to as "wake up."

As described above, a wireless node of a rank value R performs reception processing during a slot group R+1 and a slot group R−1, and performs transmission processing during a transmission slot included in a slot group R. In this embodiment, the wireless node is in the sleep state except for periods in which the transmission/reception processing is performed. Specifically, the wireless node is in the sleep state for a period from the start of a frame until the start of the slot group R+1, a period from the end of the slot group R+1 until the start of the transmission slot, a period from the end of the transmission slot until the start of the slot group R−1, and a period from the end of the slot group R−1 until the end of the frame.

For example, a wireless node I of a rank value of 3 is in the sleep state from a slot group N to a slot group 5, performs reception processing during a slot group 4, is in the sleep state from the start of a slot group 3 until the start of a transmission slot, performs transmission processing during the transmission slot, is in the sleep state from the end of the transmission slot until the start of a slot group 2, performs reception processing during the slot group 2, and is in the sleep state during a slot group 1.

When a transmission destination node (parent node) is not updated, the wireless node may be in the sleep state during the slot group R−1 because reception processing does not need to be performed in the slot group R−1.

Figure 12:
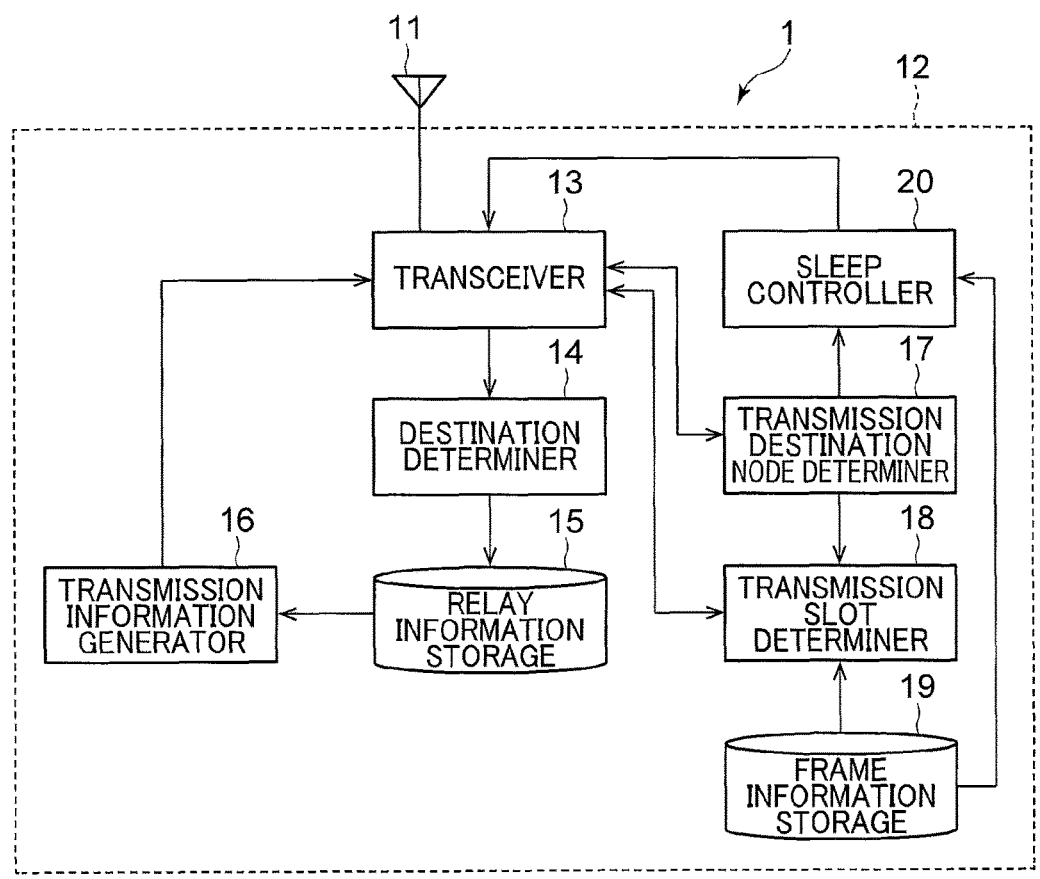
FIG. 12 is a diagram illustrating a configuration of a wireless communication apparatus according to the second embodiment.

Next, a wireless communication apparatus 1 according to this embodiment will be described with reference to FIG. 12. FIG. 12 is a diagram illustrating a configuration of the wireless communication apparatus 1 according to this embodiment. As shown in FIG. 12, a wireless communicator 12 of the wireless communication apparatus 1 further includes a sleep controller 20. Other components are similar to those in the first embodiment.

The sleep controller 20 functions regardless of the operating state of the wireless communicator 12 while power is on. The sleep controller 20 counts time and controls the operating state of the wireless communicator 12 between the sleep state and the wake-up state, based on the counted time, the rank value of self node determined by a transmission destination node determiner 17, and frame information stored in a frame information storage 19.

Specifically, the sleep controller 20 causes the wireless communicator 12 to wake up at the timing of the start of the slot group R+1, the start of the transmission slot, and the start of the slot group R−1, and causes it to sleep at the timing of the end of the slot group R+1, the end of the transmission slot, and the end of the slot group R−1.

Figure 13:
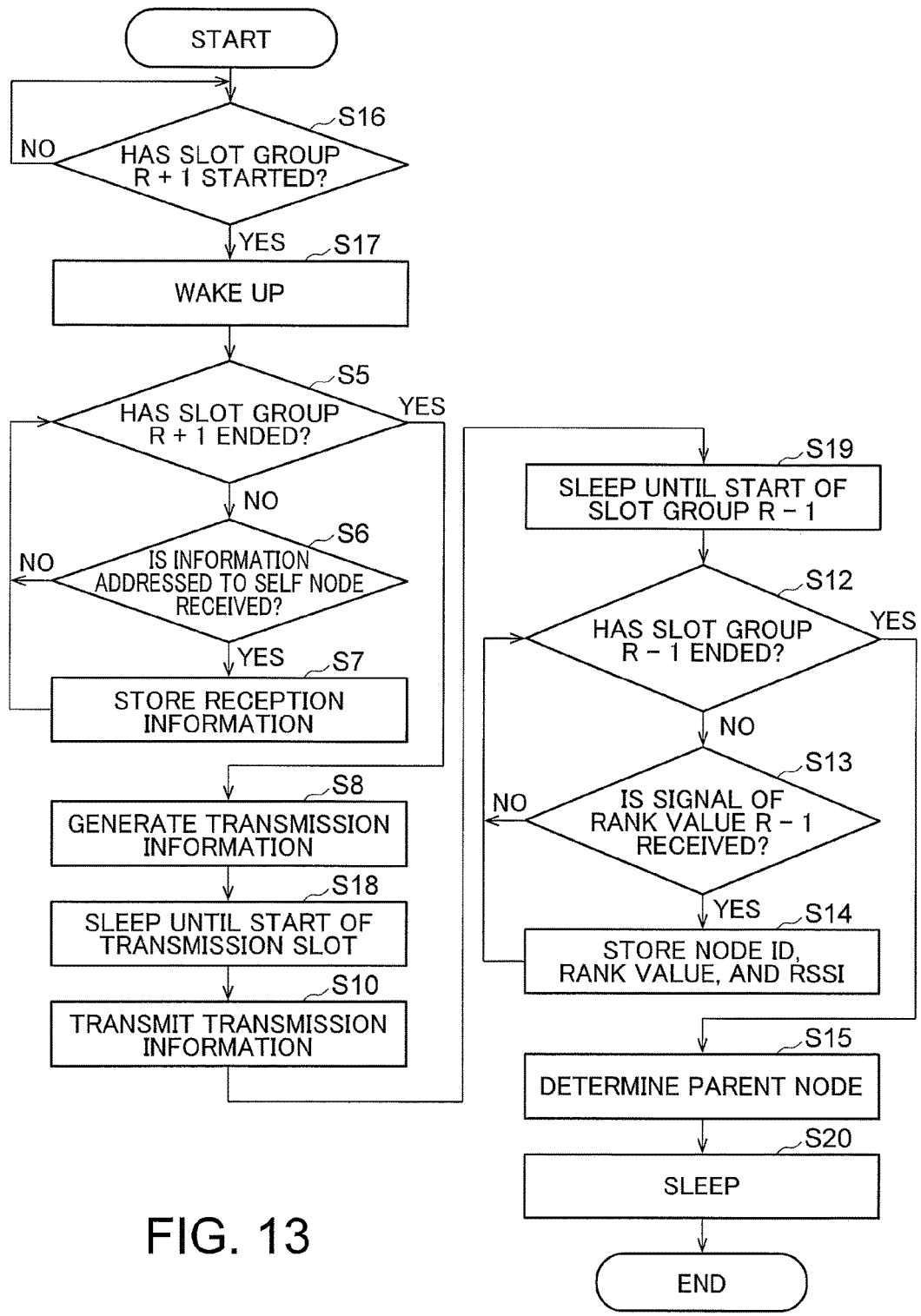
FIG. 13 is a flowchart showing an operation of the wireless communication apparatus according to the second embodiment.

Next, an operation of the wireless communication apparatus 1 according to this embodiment will be described with reference to FIG. 13. FIG. 13 is a flowchart showing a normal operation in one frame of the wireless communication apparatus 1 according to this embodiment. In FIG. 13, the wireless communicator 12 is in the sleep state at the time of starting the operation.

In step S16, the sleep controller 20 determines whether the slot group R+1 has been started, based on the counted time, the rank value R of self node, and the frame information. The sleep controller 20 repeats the determination until the slot group R+1 is started (NO in step S16). When the slot group R+1 is started, the processing proceeds to step S17.

In step S17, the sleep controller 20 causes the wireless communicator 12 to wake up. With this, the transceiver 13 starts reception processing. Subsequent steps S5 to S8 are similar to those in the flowchart in FIG. 10.

When a transmission information generator 16 generates transmission information in step S8, the processing proceeds to step S18.

In step S18, the sleep controller 20 causes the wireless communicator 12 to sleep. Thereafter, when the transmission slot is started, the sleep controller 20 causes the wireless communicator 12 to wake up. When the wireless communicator 12 has shifted to the wake-up state, the transceiver 13 transmits the transmission information to a transmission destination node (parent node). When the transmission slot ends, the processing proceeds to step S19.

In step S19, the sleep controller 20 causes the wireless communicator 12 to sleep. Thereafter, when the slot group R ends and the slot group R−1 starts, the sleep controller 20 causes the wireless communicator 12 to wake up. With this, the transceiver 13 starts reception processing. Subsequent steps S12 to S15 are similar to those in the flowchart in FIG. 10.

When the transmission destination node (parent node) is updated in step S15, the sleep controller 20 causes the wireless communicator 12 to sleep. With this, the normal operation in one frame of the wireless communication apparatus 1 completes.

As described above, the wireless communication apparatus 1 according to this embodiment is in the sleep state while information is not received/transmitted. Therefore, the power consumption of the wireless communication apparatus 1 can be reduced. Further, by the wireless communication apparatuses 1 constituting the wireless communication system, the power consumption of the entire wireless communication system can be reduced.

Third Embodiment

Next, a wireless communication system according to a third embodiment will be described with reference to FIGS. 14 to 17. FIGS. 14 to 17 are diagrams illustrating an example of a configuration of a wireless communication system according to this embodiment. In the first and second embodiments, only transmission of information from the downstream side to the upstream side (uplink) is performed, while in this embodiment, transmission of information from the upstream side to the downstream side (downlink) is also simultaneously performed. In this embodiment, a wireless communication apparatus 1 is similar to that in the first embodiment.

For a downlink, assignment of slots by the above-described uplink slot assignment method is inefficient because it takes an information transmission time of several frames. Thus, in this embodiment, slot assignment for an uplink and slot assignment for a downlink are set independently.

In slot assignment for an uplink, as in the first embodiment, a higher rank value is assigned to a slot group earlier in time in a frame, and a lower rank value is assigned to a slot group later in time. Thus, a slot earlier in time in the frame is assigned to a wireless node located further downstream.

By contrast, in slot assignment for a downlink, a lower rank value is assigned to a slot group earlier in time in the frame, and a higher rank value is assigned to a slot group later in time. Thus, a slot earlier in time in the frame is assigned to a wireless node located further upstream.

Thus, a slot earlier in time in the frame is assigned to a wireless node located further forward in an information transmission path in both the uplink and the downlink. Therefore, the wireless communication system according to this embodiment allows information transmission time to be reduced to within one frame in both the uplink and the downlink.

Further, in this embodiment, rank values are assigned to slot groups so that, with respect to any rank value R, a rank value R+1 in the uplink and a rank value R−1 in the downlink are not assigned to the same slot group. Likewise, rank values are assigned to slot groups so that, with respect to any rank value R, a rank value R−1 in the uplink and a rank value R+1 in the downlink are not assigned to the same slot group. With this, slot groups located in central portions of the frame are each assigned only one of the rank value R+1 or R−1 in the uplink and the rank value R+1 or R−1 in the downlink.

Figure 14:
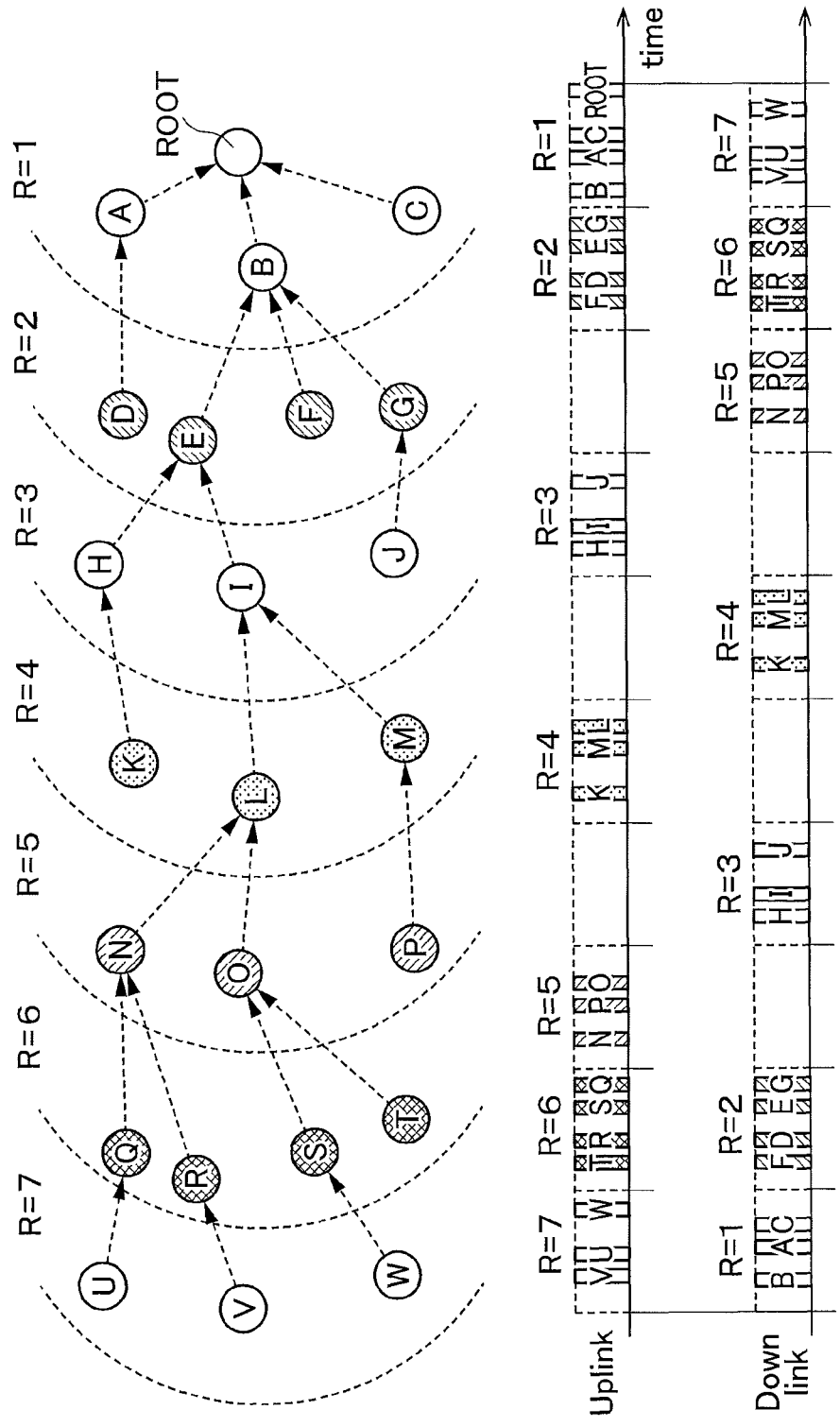
FIG. 14 is a diagram illustrating an example of a configuration of a wireless communication system according to a third embodiment.

Therefore, the third slot group in FIG. 14 is assigned only a rank value of 5 in the uplink, and the fourth slot group is assigned only a rank value of 3 in the downlink. The seventh slot group in FIG. 14 is assigned only a rank value of 3 in the uplink, and the eighth slot group is assigned only a rank value of 5 in the downlink. This can prevent interference of wireless signals between wireless nodes whose rank values are two apart.

For example, in the first slot group in the frame, a wireless node of a rank value of 7 and a wireless node of a rank value of 1 simultaneously transmit wireless signals. However, the wireless node of the rank value of 7 and the wireless node of the rank value of 1 are apart, and thus their wireless signals do not interfere.

By contrast, if a wireless node of a rank value of 5 and a wireless node of a rank value of 3 simultaneously transmit wireless signals in the third slot group in the frame, there is a fear of interference of these wireless signals because the wireless node of the rank value of 5 and the wireless node of the rank value of 3 are close to each other.

However, the assignment of rank values to slot groups as in this embodiment can prevent interference of wireless signals because the wireless node of the rank value of 5 and the wireless node of the rank value of 3 alternately transmit wireless signals.

Figure 15:
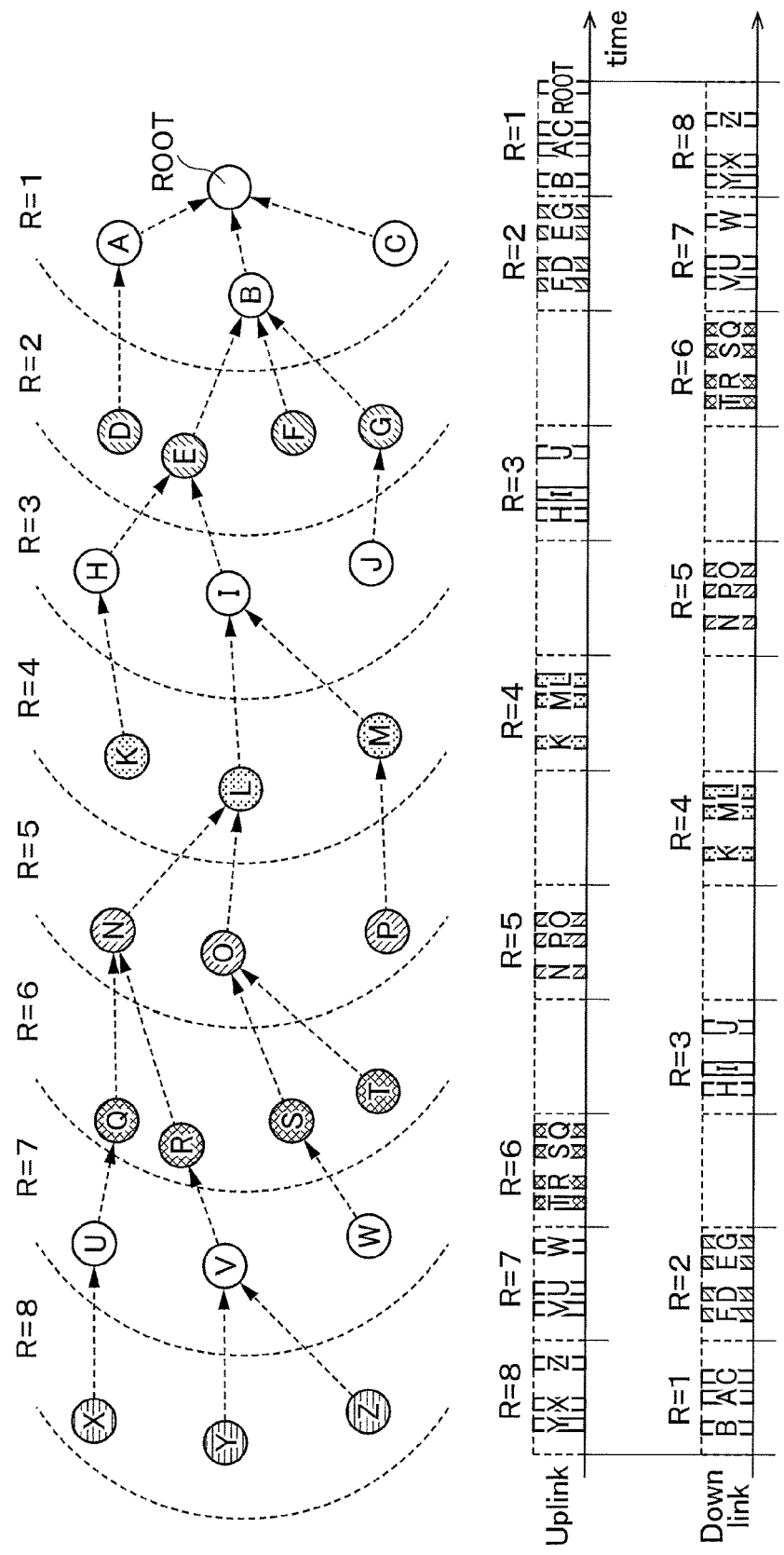
FIG. 15 is a diagram illustrating an example of a configuration of the wireless communication system according to the third embodiment.

Rank value assignment like this is likewise possible when the number of rank values is an even number (eight) as shown in FIG. 15 as well as when the number of rank values is an odd number (seven) as in FIG. 14.

When there is a fear of interference of wireless signals even when their rank values are three apart, rank values may be assigned to slot groups so that, with respect to any rank value R, a rank value R+1 (R−1) in an uplink and a rank value R−2 (R+2) in a downlink are not assigned to the same slot group. For example, the third slot group of the wireless communication system in FIG. 15 is assigned only a rank value of 6 in the uplink, and the fourth slot group is assigned only a rank value of 3 in the down link. Thus, interference of wireless signals between wireless nodes whose rank values are three apart can be prevented.

Figure 16:
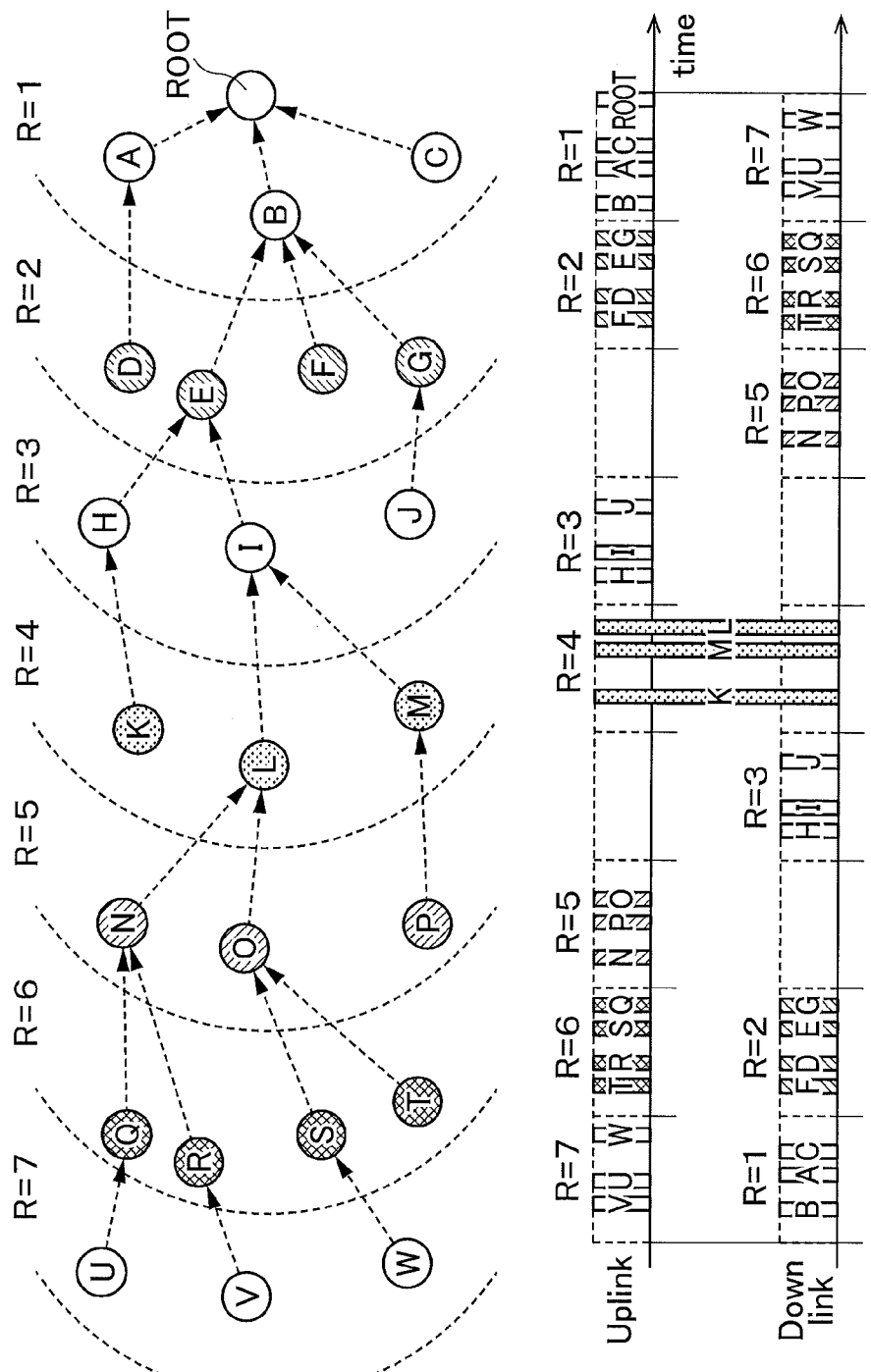
FIG. 16 is a diagram illustrating an example of a configuration of the wireless communication system according to the third embodiment.
Figure 17:
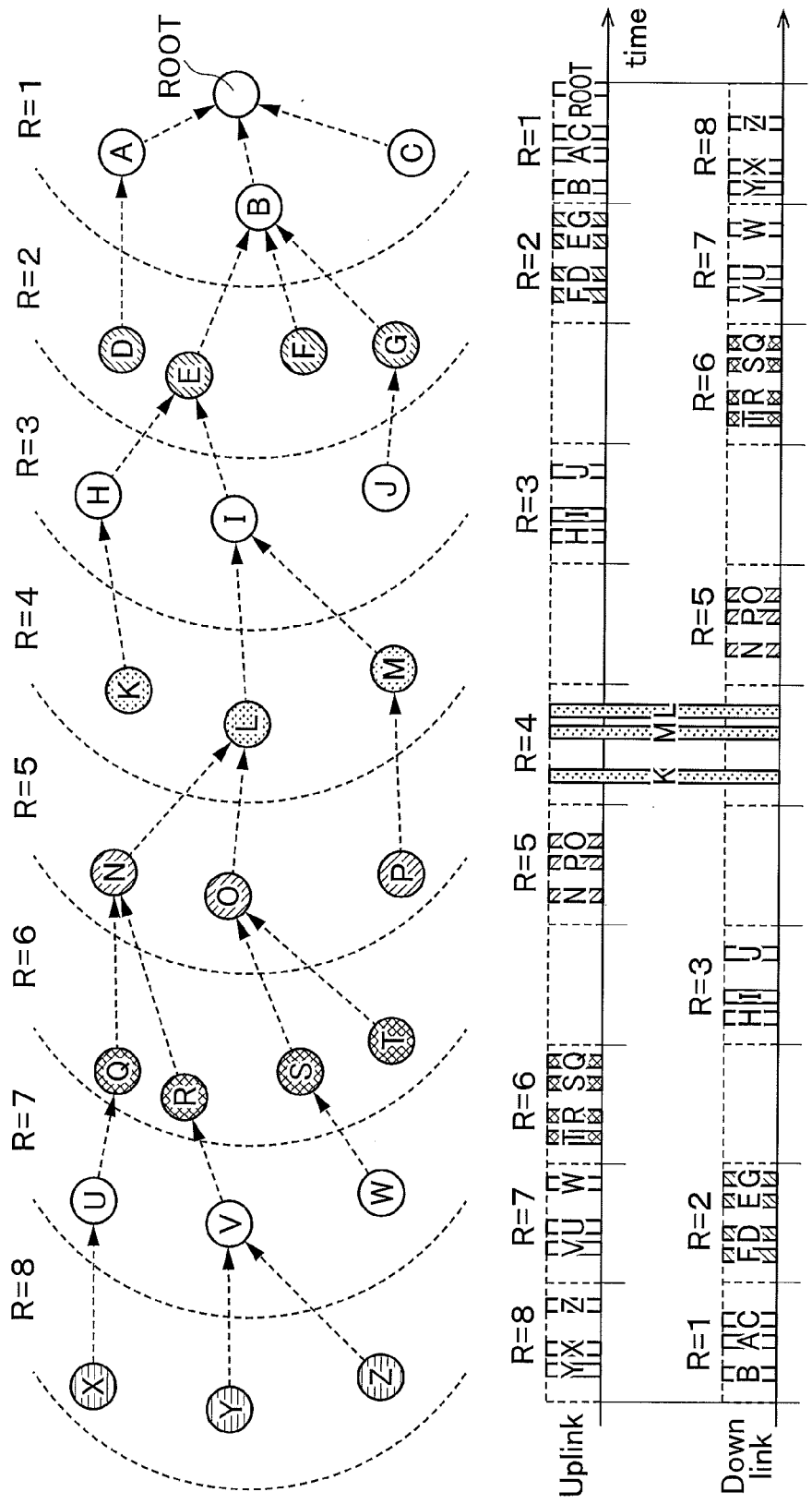
FIG. 17 is a diagram illustrating an example of the configuration of the wireless communication system according to the third embodiment.

Further, in FIGS. 14 and 15, rank values are assigned to slot groups so that a rank value R in the uplink and a rank value R in the downlink are not assigned to the same slot group. However, as shown in FIGS. 16 and 17, rank values may be assigned to slot groups so that a rank value R in the uplink and a rank value R in the downlink are assigned to the same slot group.

In this case, in the slot group assigned the rank value R in the uplink and the downlink, uplink and downlink transmissions are simultaneously performed. For example, in the case of FIG. 16, a wireless node L of a rank value of 4 simultaneously performs an uplink transmission to a wireless node I and downlink transmissions to wireless nodes N and O in a transmission slot. Thus, by assigning an uplink and downlink rank value R to the same slot group, the number of slot groups can be reduced to shorten a frame.

As described above, the wireless communication system according to this embodiment can reduce both uplink and downlink information transmission time to within one frame. Further, interference of wireless signals can be prevented to increase information transmission accuracy.

Fourth Embodiment

Figure 18:
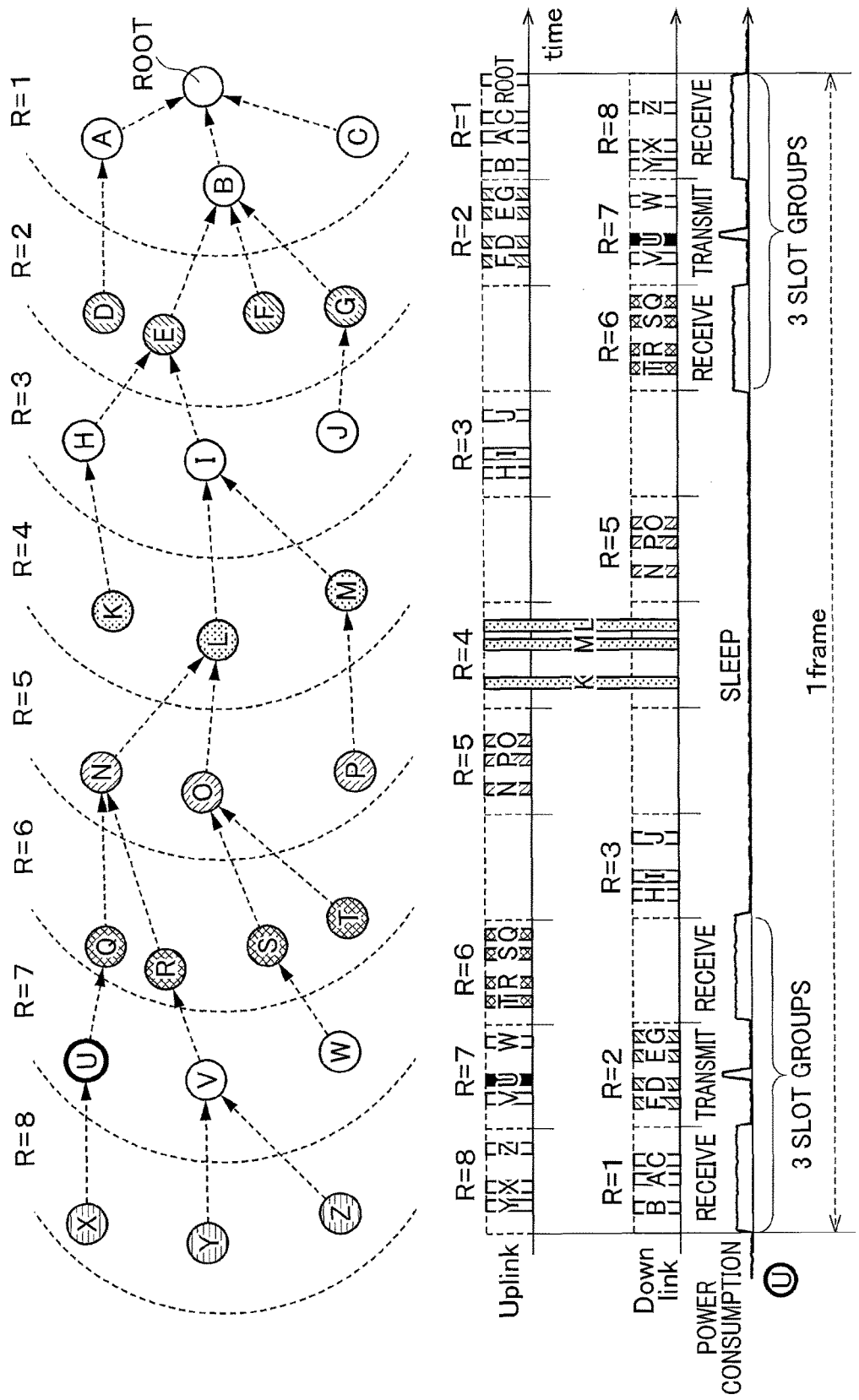
FIG. 18 is a diagram illustrating an example of a configuration of a wireless communication system according to a fourth embodiment.
Figure 19:
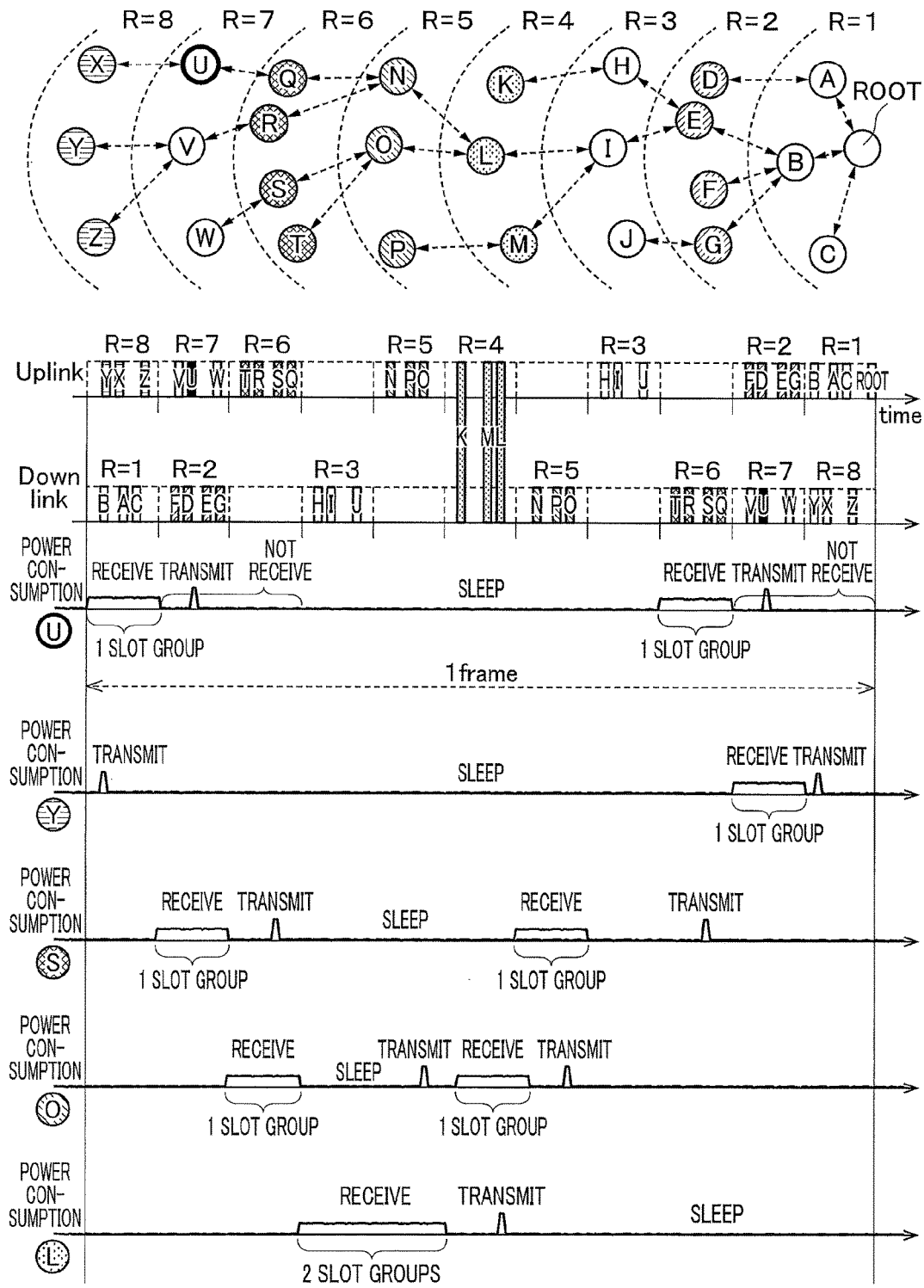
FIG. 19 is a diagram illustrating an example of the configuration of a wireless communication system according to the fourth embodiment.

Next, a wireless communication system according to a fourth embodiment will be described with reference to FIGS. 18 and 19. FIGS. 18 and 19 are diagrams illustrating an example of a configuration of a wireless communication system according to this embodiment. This wireless communication system is a wireless communication system according to the third embodiment including wireless communication apparatuses 1 according to the second embodiment. That is, a wireless communication apparatus 1 performs uplink and downlink transmissions, and is in a sleep state for predetermined periods of time.

Specifically, a wireless node of a rank value R performs transmission/reception during slot groups R+1 and R−1 and a transmission slot in an uplink, and performs transmission/reception during slot groups R+1 and R−1 and a transmission slot in a downlink.

For example, in FIG. 18, when we focus on a wireless node U of a rank value of 7, the wireless node U receives uplink relay information in the first slot group, relays the relay information in a transmission slot in the second slot group, determines an uplink transmission destination node (parent node) based on a wireless signal received in the third slot group, receives downlink relay information in the ninth slot group, relays the relay information in a transmission slot in the tenth slot group, and determines a downlink transmission destination node (child node) based on a wireless signal received in the eleventh slot group. During the other periods, that is, a period of the fourth to eighth slot groups and periods of the second and tenth slot groups except the transmission slots, the wireless node U is in the sleep state.

Thus, both uplink and downlink information transmission time can be reduced to within one frame, and the power consumption of the wireless communication apparatuses 1 and the wireless communication system can be reduced.

FIG. 19 is a modification of the wireless communication system in FIG. 18. In FIG. 19, a wireless node of a rank value R performs transmission/reception during a slot group R+1 and a transmission slot in an uplink, and performs transmission/reception during a slot group R−1 and a transmission slot in a downlink. That is, unlike in the wireless communication system in FIG. 18, the wireless node is in the sleep state during slot groups assigned an uplink and downlink rank value R−1.

For example, in FIG. 19, when we focus on a wireless node U of a rank value of 7, the wireless node U receives uplink relay information in the first slot group, relays the relay information in a transmission slot in the second slot group, receives downlink relay information in the ninth slot group, and relays the relay information in a transmission slot in the tenth slot group. The wireless node U determines a downlink transmission destination node (child node) based on a wireless signal received in the first slot group, and determines an uplink transmission destination node (parent node) based on a wireless signal received in the ninth slot group. The wireless node U is in the sleep state during the other periods, that is, periods of third to eighth and eleventh slot groups and periods of the second and tenth slot groups except the transmission slots.

With this, periods in which the wireless communication apparatuses 1 are in the sleep state become longer by two slot groups than in the wireless communication system in FIG. 18, and thus the power consumption of the wireless communication apparatuses 1 and the wireless communication system can be further reduced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication apparatus comprising:
communication circuitry configured to determine at least one other wireless communication apparatus among a plurality of other wireless communication apparatuses and to transmit first information to the at least one other wireless communication apparatus; and
a transmission slot determiner implemented by a processor and configured to determine one of a plurality of slot groups set in a frame to function as a transmission slot group in which the communication circuitry transmits the first information, wherein
different rank values are assigned to the plurality of slot groups,
the wireless communication apparatus itself is assigned a rank value corresponding to a number of hops to a root node, the transmission slot determiner determines the slot group assigned a same rank value as the rank value of the wireless communication apparatus itself, as the transmission slot group, and the communication circuitry transmits the first information in the transmission slot group.

2. The apparatus according to claim 1, wherein the transmission slot determiner determines the slot group earlier in the frame based on a higher number of hops to function as the transmission slot group.

3. The apparatus according to claim 1, wherein each of the plurality of slot groups includes a plurality of slots, and the transmission slot determiner determines one of the slots of the transmission slot group to function as a transmission slot.

4. The apparatus according to claim 1, wherein the communication circuitry receives the first information in the slot group earlier than the transmission slot group.

5. The apparatus according to claim 1, further comprising a sleep controller configured to set the communication circuitry in a sleep state in at least a part of the slot groups other than the transmission slot group and other than the slot group in which the first information is received.

6. The apparatus according to claim 1, wherein the first information is transmitted from the other wireless communication apparatus having a higher number of hops than the number of hops of the wireless communication apparatus itself.

7. The apparatus according to claim 3, wherein the transmission slot determiner is configured to determine the transmission slot based on an identifier of the wireless communication apparatus itself.

8. A wireless communication system comprising:
a plurality of wireless communication apparatuses; and
a collection apparatus configured to collect first information from the plurality of wireless communication apparatuses, wherein
different rank values are assigned to a plurality of slot groups in a frame,
the wireless communication apparatuses are assigned rank values corresponding to a number of hops to the collection apparatus, and
each of the wireless communication apparatuses specifies the slot group assigned a same rank value as the rank value of each of the wireless communication apparatuses, as a transmission slot group, and transmits the first information to other one of the wireless communication apparatuses in the transmission slot group.

9. The system according to claim 8, wherein
the wireless communication apparatuses determine the slot group earlier based on a higher number of hops, as the transmission slot group.

10. The system according to claim 8, wherein the other one of the wireless communication apparatuses is determined based on at least one of: an identifier, a number of hops, and signal strength.

11. The system according to claim 8, wherein the collection apparatus transmits second information to the plurality of wireless communication apparatuses,
as a slot group proceeds from an earlier slot group to later slot groups in the frame, the first information is collected from the wireless communication apparatus having a higher number of hops through the wireless communication apparatus having a lower number of hops to the collection apparatus, and the second information is transmitted from the collection apparatus through the wireless communication apparatus having a lower number of hops to the wireless communication apparatus having a higher number of hops.

12. The system according to claim 11, wherein a difference between a number of hops of the wireless communication apparatus which transmits the first information in one slot group in the frame and a number of hops of the wireless communication apparatus which transmits the second information in the one slot group is three or more.

13. The system according to claim 11, wherein one of the plurality of wireless communication apparatuses transmits the second information in a different slot group from the slot group for transmission of the first information among the plurality of slot groups.

* * * * *